United States Patent [19]

Foret

[11] Patent Number: 4,983,350
[45] Date of Patent: Jan. 8, 1991

[54] METHOD AND APPARATUS FOR DETECTING THE FALL OF A CONTROL CLUSTER IN A NUCLEAR REACTOR

[75] Inventor: François Foret, Courbevoie, France
[73] Assignee: Framatome, Courbevoie, France
[21] Appl. No.: 364,352
[22] Filed: Jun. 8, 1989

[30] Foreign Application Priority Data

Jun. 8, 1988 [FR] France .................. 88 07622

[51] Int. Cl.$^5$ .......................................... G21C 17/00
[52] U.S. Cl. .................................. 376/245; 376/219; 376/258
[58] Field of Search ............... 376/245, 259, 258, 219

[56] References Cited

U.S. PATENT DOCUMENTS

| | | | |
|---|---|---|---|
| 4,016,034 | 4/1977 | Musick | 176/22 |
| 4,066,497 | 1/1978 | Sato | 176/22 |
| 4,623,507 | 11/1986 | Gravelle | 376/258 |
| 4,842,805 | 6/1989 | Bourin | 376/215 |

FOREIGN PATENT DOCUMENTS 0127532 12/1984 European Pat. Off. .
0200999 11/1986 European Pat. Off. .

OTHER PUBLICATIONS

Vol. 9, No. 246 (P-393) (1969), Oct. 3, 1985–Patent Abstract of Japan.

Primary Examiner—Donald P. Walsh
Assistant Examiner—Meena Chelliah
Attorney, Agent, or Firm—Pollock, Vande Sande & Priddy

[57] ABSTRACT

The present invention seeks to obtain reliable detection of the fall of a control cluster into the core of a pressurized water nuclear reactor without giving rise to the risk of an erroneous detection causing an untimely emergency reactor stop. Four acquisition units (U1, U2, U3, U4) corresponding to the four quadrants of the reactor core receive neutron flux signals (F1), heat flux signals (P1), and cluster position signals (Z1A, Z1B, . . . ) from the various quadrants and process them to generate corresponding alarm signals. These units, together with a combination circuit (14, 18, 22), provide a cluster fall signal (24) in the presence of at least two alarm signals including at least one cluster position alarm signal. The invention is applicable to electricity power generation.

7 Claims, 2 Drawing Sheets

METHOD AND APPARATUS FOR DETECTING THE FALL OF A CONTROL CLUSTER IN A NUCLEAR REACTOR

The present invention relates to controlling a nuclear power station and more specifically to detecting the fall of a control cluster into the core of the reactor of such a station. Such detection must be reliable even if a component or a set of components in a protective system happens to be faulty. It is important for the fall of a cluster to be detected with all the required safetY in spite of the possibility of such a faulty system. Clusters are constituted by neutron-absorbing rods and nuclear power, i.e. the power evolved by the reaction, is regulated and controlled by moving the clusters. They are distributed over the horizontal section of the core. They are vertically movable in both directions. For this purpose they are hooked onto an appropriate mechanism which is situated above the core and which is controlled to cause the absorbing rods of a cluster to penetrate into the core to a greater or lesser extent. A failure in this mechanism or in the hooking member may result in a cluster falling into the core.

Such a fall gives rise to a local reduction in nuclear power, and thus to a reduction in the overall power of the core. Since there is a power-regulating servo loop, such a decrease is rapidly compensated by raising other control clusters. However, this gives rise to various drawbacks including neutron flux distortion, thereby slowing down combustion of the fuel elements close to the fallen cluster and accelerating combustion elsewhere. In addition, the range of action possible on the reaction is reduced. That is why it is desirable to detect such accidental falls as reliably and as quickly as possible in order to perform an emergency reactor stop and reestablish normal operation thereof.

It is also necessary to avoid performing such an emergency stop if that is unnecessary, since such a stop is expensive, in particular because it reduces the availability of the nuclear power station for providing electricity.

In a known method for detecting falls of control clusters, use is made of detection means which are also applicable to other types of accident. More precisely, these means detect the excessive temperatures caused by pockets of steam appearing at various points in the core along the rods constituting the fuel elements. When a cluster falls accidentally, the first rise in nuclear power to a certain level after the fall has taken place causes such an excess temperature or pocket of steam to appear along a fuel element whose combustion is accelerated by the flux distortion. Different automatic protection means then cause an emergencY reactor stop. Thereafter the cause of the stop is determined and the consequences of the accident are repaired prior to putting the reactor back into service.

This known method suffers from the drawback that a fairly long period of time may elapse before the nuclear power is raised high enough to give rise to the above-described stop process, particularly if the anti-reactivity of the fallen cluster is relatively low. The combustion rate of some fuel elements can thus be increased, thereby initiating nucleated boiling.

A particular object of the present invention is to provide reliable and rapid detection of the fall of a control cluster, even when the position and/or the low degree of anti-reactivity of the fallen cluster gives rise to only a small variation in nuclear power, while simultaneously avoiding as far as possible the danger of a false detection giving rise to an unnecessary emergency reactor stop. Another object of the invention, by virtue of such detection, is to provide better protection for the reactor of a power station against the damaging consequences which would arise from continuing the nuclear reaction in normal service after a cluster has fallen, while preserving the availability of the power station.

The invention seeks to achieve these objects in a manner which is both simple and cheap. That is why the present invention provides a method of detecting the fall of a control cluster in a nuclear reactor, wherein "sensitive" parameters sensitive to displacements of the control clusters of the reactor are measured on a long-term basis, and a cluster fall signal is generated when one of said parameters varies at a speed greater than a predetermined alarm threshold corresponding to said parameter, the method being characterized by the fact that said sensitive parameters which are measured include parameters of at least a first type and a second type, said first type being constituted by position parameters representative of the positions of said control clusters themselves, and said second type being constituted by parameters which are sensitive to displacements of control clusters even when said clusters are situated at a distance from points where said parameters are measured, that the parameters of each of these two types are measured in at least two zones of the core of said reactor, and that said cluster fall signal is generated when at least two of said sensitive parameters varies at a rate greater than said corresponding alarm thresholds, with one of said two parameters being one of said position parameters.

In a preferred disposition, said second type of sensitive parameter and optionally a third type of sensitive parameter are constituted by neutron flux parameters representative of the nuclear power evolved in each of said zones of the core or/and by heat flux parameters representative of the heat flux removed by cooling fluid flowing through each of said zones.

The present invention also provides an apparatus for detecting the fall of a control cluster into the core of a nuclear reactor, said core comprising a plurality of zones each provided with:
  heat measurement means for providing a heat flux signal corresponding to said zone and representative of heat flux removed by the flow of a cooling fluid through said zone;
  neutron measuring means for providing a neutron flux signal corresponding to said zone and representative of nuclear power in said zone; and
  a plurality of control clusters, with each of said control clusters being provided with measurement means for providing a cluster position signal representative of the position of said cluster;
  said apparatus comprising differentiation and comparison means for receiving "sensitive" signals sensitive to the displacements of the control clusters and for providing corresponding alarm signals whenever said sensitive signals vary at a rate greater than corresponding predetermined alarm thresholds; and
  logical processor means for providing a cluster fall signal in the presence of a plurality of said alarm signals;
  said apparatus being characterized by the fact that said alarm signals include at least signals of a first type and of a second type, said first type being constituted by position alarm signals corresponding to said cluster position signals and a second type being constituted by heat alarm signals corresponding to said heat flux signals and/or by neutron alarm signals corresponding to said neutron flux signals, said logic processing means providing said cluster fall signal on receiving at least two of said alarm signals including at least one of said position alarm signals.

The following preferred dispositions in accordance with the invention may also be adopted:

said logic processing means comprise:

primary logic units each of which receives said position alarm signals corresponding to at least one of said core zones and at least one of said second type alarm signals corresponding to another of said zones, and for providing a primary detection signal when at least one of said alarm signals is present; and a combination circuit receiving said primary detection signals and said position alarm signals and providing said cluster fall signal when at least two of said primary detection signals and at least one of said position alarm signals are present;

said differentiation and comparison means are associated with said primary logic units in such a manner that, together with a corresponding portion of said means, each of said logic units constitutes an acquisition unit;

said acquisition units constitute a succession corresponding to the succession of said zones in the core of the nuclear reactor; and each of said acquisition units receives a group of said cluster position signals corresponding to one of said core zones, said neutron flux signal corresponding to another core zone, and said heat flux signal corresponding to yet another core zone, such that said neutron flux signals, said heat flux signals, and said groups of cluster position signals are each received by one and one only of the acquisition units.

An implementation of the invention is described by way of non-limiting example and with reference to the accompanying diagrammatic figures. In the description, those dispositions which are mentioned below as being preferred in accordance with the present invention should be considered as being used. It should also be understood that the elements described and shown may be replaced by other elements providing the same technical functions without going beyond the scope of the invention.

Figure 1:
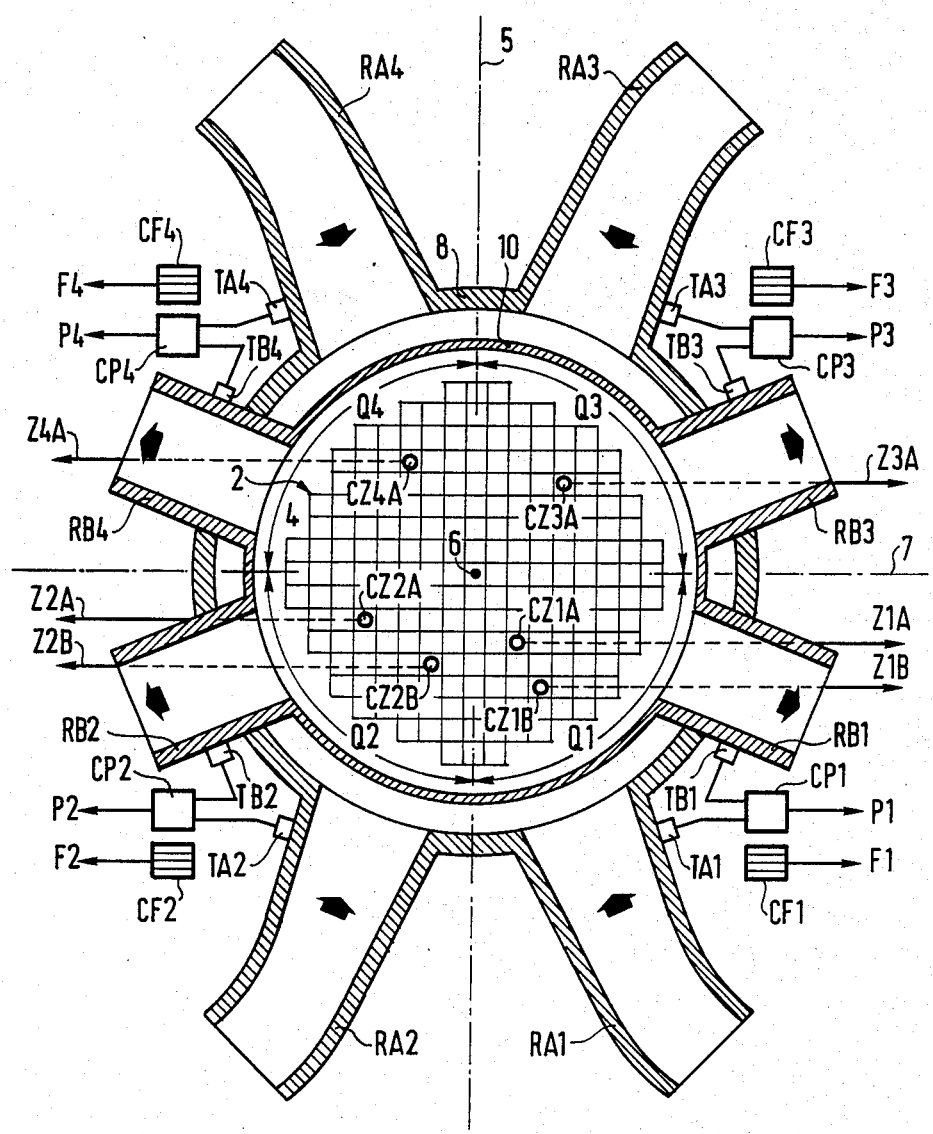
FIG. 1 is a horizontal section through a nuclear reactor provided with apparatus in accordance with the invention.

As shown in FIG. 1, the core 2 of the reactor in a pressurized water nuclear power station is constituted by juxtaposing housings such as 4 in a horizontal square mesh grid, which housings extend vertically over the entire height of the core and contain fuel elements (not shown). Some of these housings are occupied by control clusters (not shown) each of which is provided, above the core, firstly with a mechanism (not shown) for controlling vertical displacement thereof, and secondly with measuring means such as CZ2A and CZ2B for permanently measuring the height of the cluster, i.e. the position within its housing. These measuring means provide position signals such as Z2A and Z2B.

The core 2 has a vertical axis 6 and is divided about two planes of symmetry 5 and 6 into four quadrants Q1, Q2, Q3, and Q4 which follow one another angularly around said axis and which constitute the said core zones.

Elements specific to any one such quadrant are designated by one or more letters followed by one of the numbers 1 to 4 which is the number of the quandrant. An additional letter following the number is used in alphabetical order to distinguish between different ones of a plurality of specific elements of the same nature, for example said cluster positioning measuring means CZ2A, CZ2B, etc. ..., which belong to the same quadrant, e.g. the second quadrant Q2.

In each quadrant, the number of control clusters is 18, for example, and likewise there are 18 distinct measuring means used for indicating the positions of the clusters, and 18 distinct position signals such as Z2A and Z2B which are provided by these measuring means.

The core 2 is contained in a pressure vessel 8 capable of withstanding the water pressure of a primary cooling circuit and containing an internal skirt 10 surrounding the core. The water arrives at the top of the pressure vessel via inlet ducts, it descends around said skirt to the bottom of the vessel, it passes radially to the inside of the skirt at the bottom of the vessel, and it rises while cooling the fuel elements prior to leaving from the top of the vessel via outlet ducts which are connected for that purpose to the skirt. More precisely, the fuel elements in the quadrants Q1, Q2, Q3, and Q4 are cooled by water which enters via four inlet ducts RA1, RA2, RA3, and RA4, and which leaves via four outlet ducts RB1, RB2, RB3, and RB4 each constituting a part of a respective one of four primary cooling circuits.

These ducts are provided with temperature sensors TA1, TA2, TA3, TA4, TB1, TB2, TB3, and TB4 respectively. The two temperature sensors such as TA3 and TB3 associated with the same quadrant such as Q3 are connected to means such as CP3 for measuring the heat flux and generating a heat flux signal such as P3 which is representative of the heat flux removed by the flow of water in the quadrant. In order to obtain this signal, the measuring means such as CP3 multiplies the inlet to outlet temperature difference by the water flow rate, said flow rate being given by means (not shown) which measure, for example, the speed of the pumps in the primary cooling circuit which includes the inlet and outlet ducts in question. The measuring means CP3 also performs various correction operations that are not related to the present invention, in particular measuring the pressure in the cooling circuit pressurizer, so as to ensure that the resulting heat flux signal is as accurate a representation as possible of variations in heat flux over time. The measuring means CP1, CP2, and CP4 operate like the means CP3 for the purpose of providing respective signals P1, P2, and P4.

Each of the four quadrants Q1, Q2, Q3, and Q4 is provided with measuring means CF1, CF2, CF3, and CF4 providing a neutron flux signal F1, F2, F3, and F4 representative of the mean neutron flux within each of the quadrants respectively.

The signals representative of cluster position, heat flux, and neutron flux obtained in this way constitute the above-mentioned "sensitive" signals, with the "sensitive" parameters being those represented by said signals.

Figure 2:
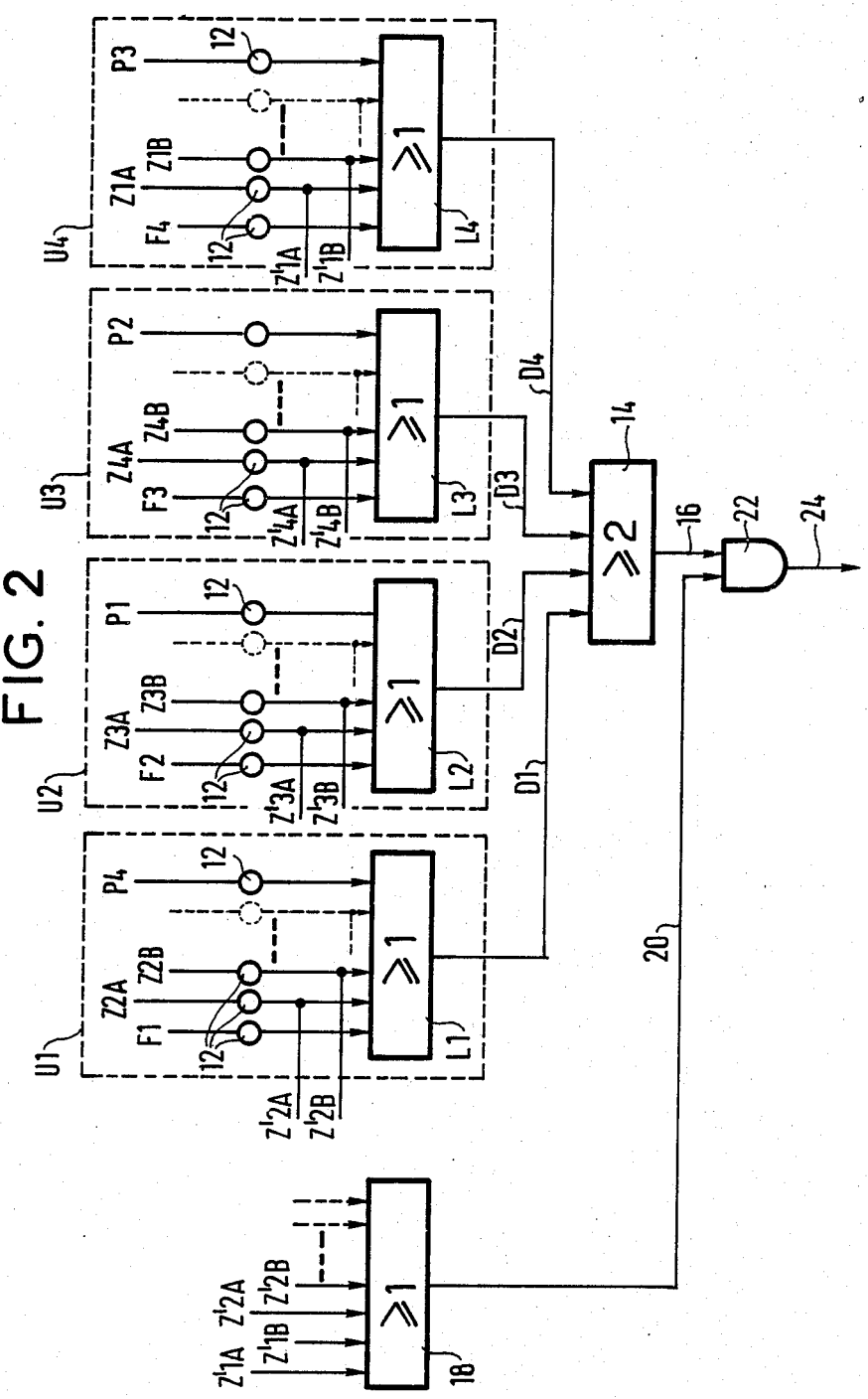
FIG. 2 is a block diagram of the apparatus.

As shown in FIG. 2, apparatus in accordance with the invention comprises four acquisition units U1, U2, U3, and U4 which receive said sensitive signals. Each of these units, e.g. U1, receives the neutron flux signal, e.g. F1, corresponding to one of the quadrants, e.g. Q1, the heat flux signal, e.g. P4, corresponding to another quadrant, e.g. Q4, and the group of cluster position signals, e.g. Z2A, Z2B, etc. ..., corresponding to yet another quadrant, e.g. Q2.

For each of these signals, each of said units includes differentiation and comparison means such as 12 which receive a corresponding sensitive signal and which provide a corresponding alarm signal whenever its sensitive signal varies at a rate greater than a corresponding predetermined alarm threshold. The processing to which each sensitive signal is subjected is in fact more complex than that in order to take account, in particular, of the various time offsets in these signals relative to the real physical parameters that they represent and due to measurement conditions.

Each alarm signal, e.g. F'1 or Z'2A is designated by the same letters and numerals as the corresponding sensitive signal, e.g. F1 or Z2A, together with a prime symbol.

Within each of the acquisition units U1, U2, U3, and U4, a respective primary logic unit L1, L2, L3, or L4 receives all of the alarm signals provided by the differentiation and comparison means such as 12 and provides a respective primary detection signal D1, D2, D3, or D4 whenever at least one of the arm signals is present.

A circuit 14 receives these primary detection signals and provides a signal 16 whenever at least two of the primary detection signals are present.

Further, an OR gate 18 receives all of the position alarm signals Z'1A, Z'1B, ..., Z'2A, Z'2B, ..., Z'3A, ..., Z'4A, ... obtained from said cluster position signals and provides a signal 20 whenever at least one of these position alarm signals is present.

An AND gate 22 provides a cluster fall signal 24 whenever the signal 16 and the signal 20 are present simultaneously. The circuit 14 and the gates 18 and 22 constitute the above-mentioned combination circuit.

It can be seen in FIG. 2 that an emergency reactor stop can be caused by the cluster fall detection signal 24 only if there is a rapid drop in neutron flux or in heat flux accompanied by at least one rapid drop in a cluster position signal. In particular, there is no danger of an untimely emergency stop when the power station is isolated, i.e. when it is temporarily disconnected from the electricity grid to which it normally supplies power.

During such isolation, the reactor power decreases progressively in order to adjust the power to the desired value. The control clusters are inserted so as to travel along their full stroke over a period of several minutes, whereas a falling cluster takes less than one minute to fall.

What is claimed is:

1. Apparatus for detecting the fall of a control cluster into the core of a nuclear reactor, said core comprising a plurality of zones (Q1, Q2, Q3, Q4) each (Q1) provided with:
   heat measurement means (T1A, T1B, CP1) for providing a heat flux signal (P1) corresponding to said zone and representative of heat flux removed by the flow of a cooling fluid through said zone;
   neutron measuring means (CF1) for providing a neutron flux signal (F1) corresponding to said zone and representative of nuclear power in said zone; and
   a plurality of control clusters, with each of said control clusters being provided with measurement means (CZ1A, CZ1B, ...) for providing a cluster position signal (Z1A, Z1B, ...) representative of the position of said cluster;
   said apparatus comprising differentiation and comparison means (12) for receiving "sensitive" signals sensitive to the displacements of the control clusters and for providing corresponding alarm signals whenever said sensitive signals vary at a rate greater than corresponding predetermined alarm thresholds; and
   logical processor means for providing a cluster fall signal in the presence of a plurality of said alarm signals;
   said apparatus being characterized by the fact that said alarm signals include at least signals of a first type and of a second type, said first type being constituted by position alarm signals (Z'1A, Z'1B, ..., Z'2A, Z'2B, ..., Z'3A, Z'3B, ..., Z'4A, Z'4B, ...) corresponding to said cluster position signals (Z1A, Z1B, ..., Z2A, Z2B, ..., Z3A, Z3B, ..., Z4A, Z4B, ...) and a second type being constituted by heat alarm signals (P'1, P'2, P'3, P'4) corresponding to said heat flux signals (P1, P2, P3, P4) and/or by neutron alarm signals (F'1, F'2, F'3, F'4) corresponding to said neutral flux signals (F1, F2, F3, F4), said logic processing means (L1, L2, L3, L4, 14, 18, 22) providing said cluster fall signal (24) on receiving at least two of said alarm signals including at least one of said position alarm signals.

2. Apparatus according to claim 1, characterized in that said logic processing means comprise:
   primary logic units (L1, L2, L3, L4) each of which (L1) receives said position alarm signals ((Z'2A, Z'2B, ...) corresponding to at least one of said core zones (Q2) and at least one of said second type alarm signals (F'1, P'4) corresponding to another of said zones (Q4), and for providing a primary detection signal (D1) when at least one of said alarm signals is present; and
   a combination circuit (14, 18, 22) receiving said primary detection signals (D1, D2, D3, D4) and said position alarm signals (Z'1A, Z'1B, ..., Z'2A, Z'2B, ..., Z'3A, Z'3B, ..., Z'4A, Z'4B, ...) and providing said cluster fall signal (24) when at least two of said primary detection signals and at least one of said position alarm signals are present.

3. Apparatus according to claim 2, characterized by the fact that said differentiation and comparison means (12) are associated with said primary logic units (L1, L2, L3, L4) in such a manner that, together with a corresponding portion of said means, each of said logic units (L1) constitutes an acquisition unit (U1).

4. Apparatus according to claim 3, characterized by the fact that said acquisition units (U1, U2, U3, U4) constitute a succession corresponding to the succession of said zones (Q1, Q2, Q3, Q4) in the core of the nuclear reactor.

5. Apparatus according to claim 4, characterized by the fact that each of said acquisition units (U1) receives a group of said cluster position signals (Z2A, Z2B, ...) corresponding to one of said core zones (Q2), said neutron flux signal (F1) corresponding to another core zone (Q1), and said heat flux signal (P4) corresponding to yet another core zone (Q4), such that said neutron flux signals (F1, F2, F3, F4), said heat flux signals (P1, P2, P3, P4), and said groups of cluster position signals (Z1A, Z1B, ..., Z2A, Z2B, ..., Z3A, Z3B, ..., Z4A, Z4B, ...) are each received by one and one only of the acquisition units (U1, U2, U3, U4).

* * * * *